(12) United States Patent
Meurer

(10) Patent No.: US 9,771,218 B2
(45) Date of Patent: Sep. 26, 2017

(54) METHOD AND STATION FOR PICKING ARTICLES ACCORDING TO THE GOODS-TO-MAN PRINCIPLE

(71) Applicant: Dematic GmbH, Heusenstamm (DE)

(72) Inventor: Hans Christoph Meurer, Roβdorf (DE)

(73) Assignee: Dematic GmbH, Heusenstamm (DE)

( * ) Notice: Subject to any disclaimer, the term of this patent is extended or adjusted under 35 U.S.C. 154(b) by 0 days.

(21) Appl. No.: 15/241,220

(22) Filed: Aug. 19, 2016

(65) Prior Publication Data

US 2016/0355340 A1  Dec. 8, 2016

Related U.S. Application Data

(63) Continuation of application No. PCT/EP2015/053260, filed on Feb. 17, 2015.

(30) Foreign Application Priority Data

Feb. 19, 2014  (DE) .................. 10 2014 102 092

(51) Int. Cl.
*B65G 1/00* (2006.01)
*B65G 1/137* (2006.01)

(52) U.S. Cl.
CPC ........ *B65G 1/1378* (2013.01); *B65G 2209/04* (2013.01)

(58) Field of Classification Search
CPC ...... B65G 1/137; B65G 47/10; B65G 1/1376; B65G 1/1378; B65G 1/00; B66B 17/00
USPC ..... 198/347.1, 347.4, 358, 349; 53/473, 235
See application file for complete search history.

(56) References Cited

U.S. PATENT DOCUMENTS

| 4,921,087 A * | 5/1990 | Nakamura ........... B65G 1/1376 198/341.03 |
| 7,428,958 B2 * | 9/2008 | Tanaka ................ G03F 7/70741 198/468.01 |
| 7,766,151 B2 * | 8/2010 | Schaefer ............. B65G 1/1378 198/370.01 |
| 8,839,945 B2 * | 9/2014 | Gruber ................. B65G 1/1378 198/370.06 |
| 9,014,843 B2 * | 4/2015 | Winkler ............. G06Q 10/0875 198/347.1 |

(Continued)

FOREIGN PATENT DOCUMENTS

| DE | 102004014378 | 10/2005 |
| DE | 102005056938 | 5/2007 |

(Continued)

OTHER PUBLICATIONS

International Preliminary Report on Patentability for PCT/EP2015/053260, dated May 27, 2016 (English Translation).

(Continued)

*Primary Examiner* — James R Bidwell
(74) *Attorney, Agent, or Firm* — Womble Carlyle Sandridge & Rice, LLP

(57) ABSTRACT

Disclosed is a method for picking items according to the goods-to-man principle a picking station in which items are placed in order load carriers that are conveyed through the picking station in a row, and the put place of the order load carriers in the row changes when a chronologically preceding order load carrier is loaded and conveyed away. This disclosure also relates to a corresponding order picking station.

10 Claims, 2 Drawing Sheets

(56) References Cited

U.S. PATENT DOCUMENTS

2013/0312371 A1 11/2013 Ambrose

FOREIGN PATENT DOCUMENTS

| | | |
|---|---|---|
| EP | 1790591 | 5/2007 |
| EP | 2050695 | 4/2009 |
| EP | 2098464 | 9/2009 |
| EP | 2327644 | 6/2011 |
| EP | 2607271 | 6/2013 |
| FR | 2713612 | 6/1995 |
| WO | WO 2007/068406 | 6/2007 |
| WO | WO 2013/033743 | 3/2013 |
| WO | WO 2013/090962 | 6/2013 |

OTHER PUBLICATIONS

International Search Report dated May 6, 2015, for International Application PCT/EP2015/053260, which is related to this application.

Written Opinion dated May 6, 2015, for International Application PCT/EP2015/053260, which is related to this application.

* cited by examiner

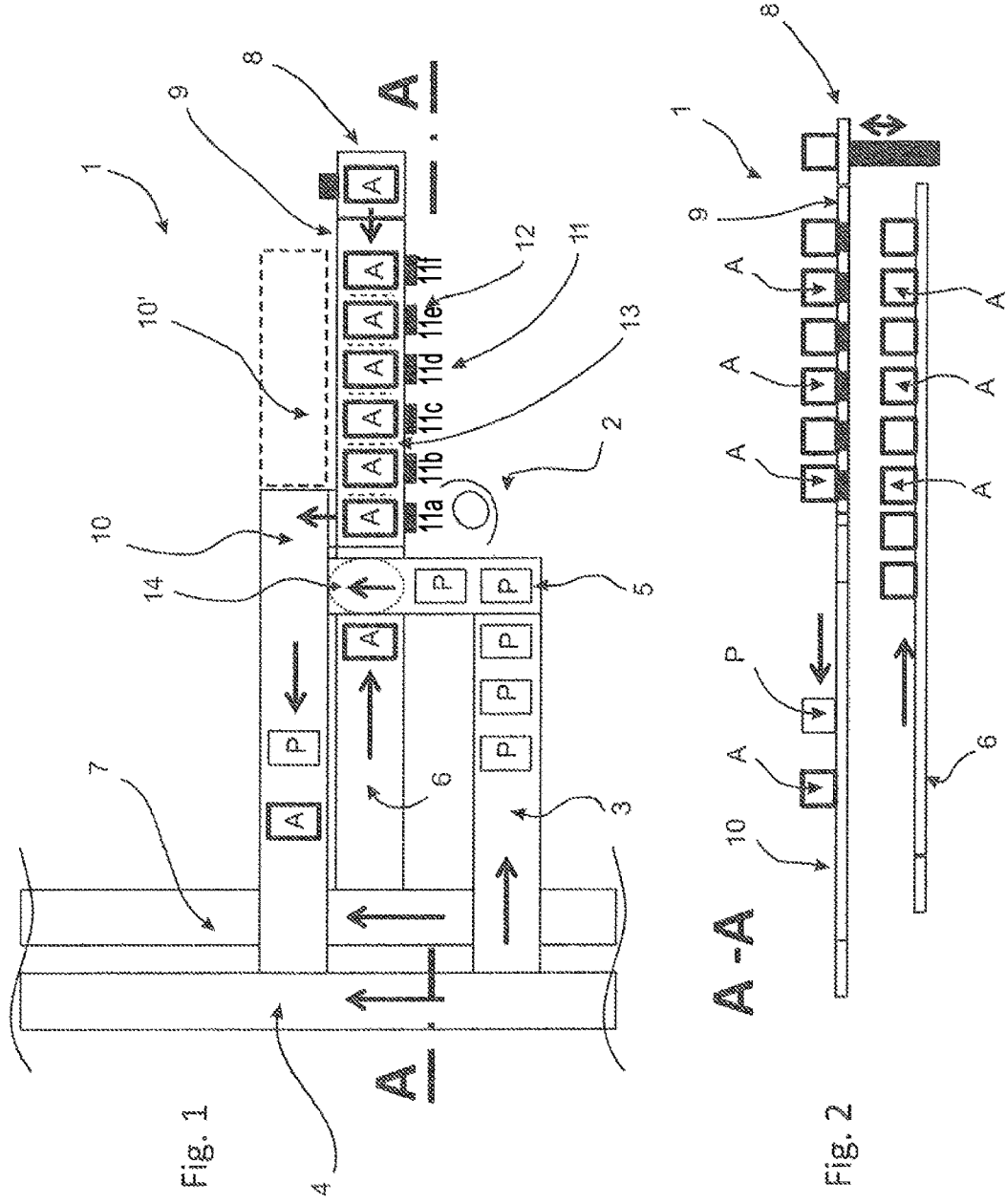

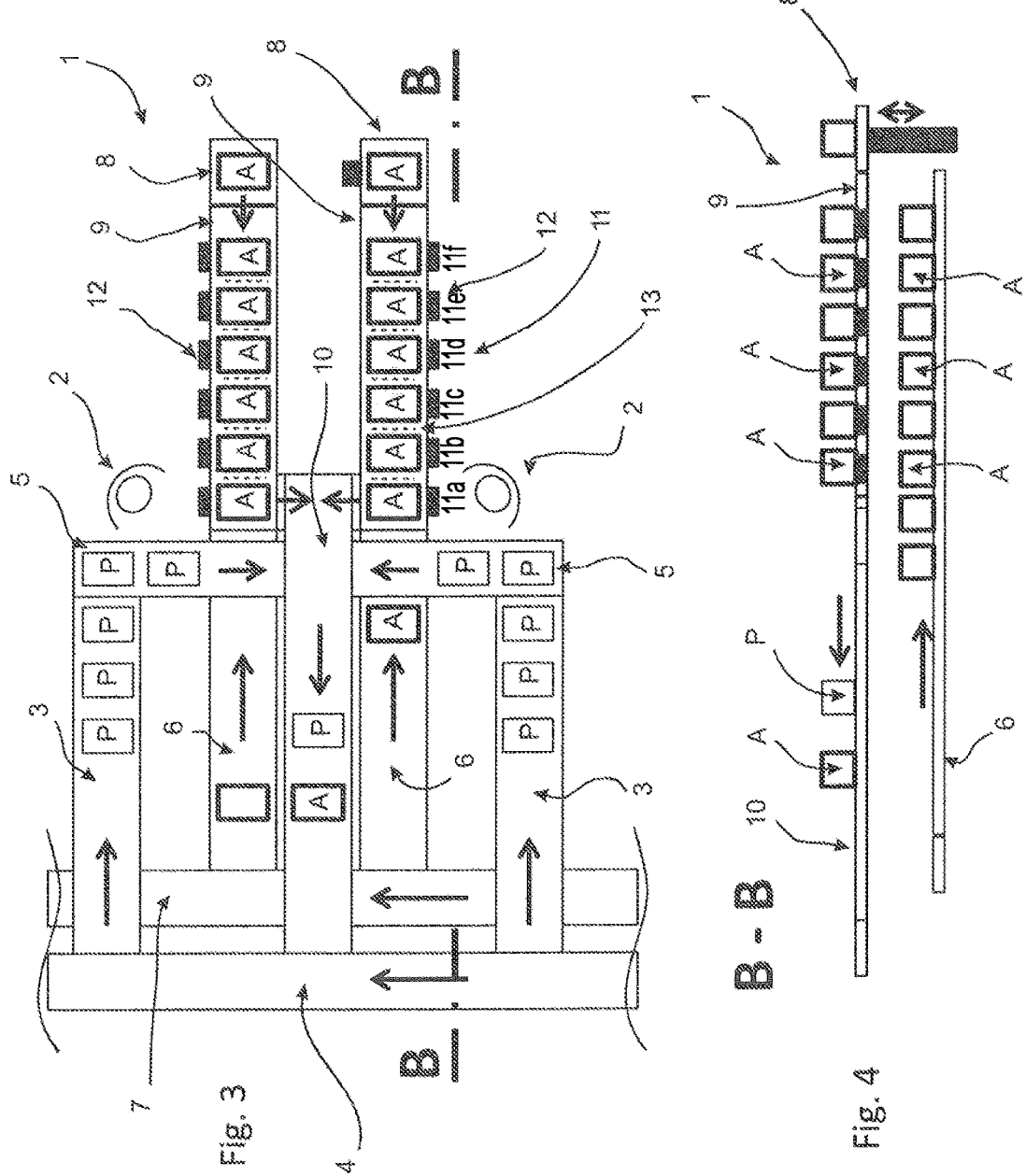

METHOD AND STATION FOR PICKING ARTICLES ACCORDING TO THE GOODS-TO-MAN PRINCIPLE

CROSS-REFERENCE TO RELATED APPLICATIONS

This application is a continuation of International Patent Application No. PCT/EP2015/053260 filed on Feb. 17, 2015, and which claims priority to German Patent Application No. 10 2014 102 092.8, filed on Feb. 19, 2014.

INCORPORATION BY REFERENCE

The disclosures of International Patent Application No. PCT/EP2015/053260, which was filed on Feb. 17, 2015, which claims priority to German Patent Application No. 10 2014 102 092.8, filed on Feb. 19, 2014, are hereby specifically incorporated by reference herein as if set forth in their entireties.

TECHNICAL FIELD

This disclosure relates to a method for picking articles according to the goods-to-man principle at a picking station, in which articles are picked in an order load carrier, and to a corresponding picking station.

BACKGROUND

Picking stations can be operated according to the goods-to-man principle. In that case, the goods or articles of an order are transported to the respective picking station, for which purpose they are usually brought in inside containers, on trays etc. At that location, they are removed from the so-called storage or product containers and placed into the corresponding containers, trays, etc. of an order, so-called order containers.

This process is usually repeated until the respective order or partial order is completed using the zone picking process.

In order to increase throughput, the worker usually picks a plurality of orders in parallel and so a plurality of order containers are kept in readiness in parallel in the picking station.

The picker can thus be shown by means of displays where the articles are to be placed. This is accordingly called "put-to-light." If, in addition, a plurality of product containers are transported analogously to the picking station, a pick-to-light method can also be carried out and so the removal of articles can be simplified.

A put place is thus a place or area for order containers into which the goods/articles from the storage containers are correspondingly placed by the picker.

A put-to-light display is accordingly a display for the picker, to indicate which order containers the picker is to place the article just removed from the product container, or a plurality of articles or the packing unit, etc.

Conversely, the pick place is the place or area for a product container from which the picker removes the articles etc. A pick-to-light display is accordingly a display which displays to the picker the product container and/or possibly the articles and/or the quantity thereof for the picking step.

From EP 2 050 695 A1, EP 2 098 464 A1 and WO 2013/033743 A1 corresponding picking stations are known, in which a plurality of order containers are held in the picking station at the same time and are filled with articles from a central place with changing product containers. Although the presentation of a plurality of order containers reduces the demands placed on the sequence of product containers, this means that the picking stations are fitted with a connection to the central conveying system for each put place, which makes the structure complex and expensive as well as troublesome to maintain, and a lot of space is taken up. Since an order does not change its put place, the picking processes are distributed uniformly over all put places and the picker must cover relatively long distances.

Therefore, there continues to be a need for a simplified picking solution according to the goods-to-man principle, in which the structure of the picking stations is simplified and picking is made easier for the picker without reducing the throughput.

SUMMARY

In accordance with this disclosure, it can be recognized that, when the order load carriers are conveyed in a row through the picking station and thus the respective put place of the load carrier in the row changes, it can be possible to simplify the conveying system connection since not every put place may require a connection as the load carrier may not travel selectively to each free place. In other words, load carriers can be conveyed in "chronological order" through the picking station, i.e., the oldest load carriers are at the beginning of the row and the newest at the end.

The articles can either be conveyed directly as such when this is permitted by the article properties, or can be present in the product load carrier and be picked therefrom.

Each order load carrier is thus allocated a changing put place. In other words, if an order load carrier in the row is fully loaded and then "disposed of" the following order load carrier can be moved up in order to produce a gap-free row. These thus can change their put place.

Therefore, the walking distances of the picker can be reduced since the oldest load carriers or articles in the picking station are most frequently the target of the next picking process since the load carrier belonging thereto were likewise in transit to the picking station for the longest time (in terms of transport time) and therefore usually arrive earlier. The picking processes thus can be distributed to the oldest load carrier in the row.

In other words, the articles or product load carrier for completion of the loading of an order load carrier at the beginning of the row may have already been requested before others further back in the row and therefore also can arrive at the pick place before the other product load carriers or articles provided that the conveying path to the picking station allows this, since they had the most time for this.

Therefore, the main pick put place, e.g., at the beginning of the row, can be supplied with articles most frequently in statistical terms. Therefore, the picker has to cover shorter distances.

It has proved to be the case, e.g., that therefore about 80% of all picking processes (picks) are distributed over the three oldest order load carriers when the sequencing rules permit picking in the oldest 6 order load carriers; the picking station thus can have 6 put places, e.g., 11a-f, though more or less order load carriers and put places can be employed without departing from this disclosure, for example, 5 or less order load carriers and picking stations, 7 or more order load carriers and picking stations, or combinations thereof.

When, from a product load carrier, picking of a plurality of order load carriers or, from a plurality of product load carriers, an order load carrier is possible, a series effect can also be achieved in order to improve the throughput.

A further reduction in the sequencing requirements can be achieved when more than one, preferably two, product load carriers or articles can be accessed at the picking station at the same time.

Furthermore, in accordance with this disclosure, provision can be made such that, when an article or product load carrier has been used, i.e. the picker has removed desired articles for the picking order, these are immediately transported further and the next article or product load carrier moves up. The confirmation of error-free performance of the respective picking step can also be immediate. However, so that a correction remains possible, the discharged article or the product load carrier may be held in a buffer zone which lies within reach of the picker. Therefore, in the event of an error, the picker can still access the articles in order to grasp further articles or put back articles.

If both the order load carrier and also the product load carrier or articles are each conveyed in a row through the picking station, possibly in reversed conveying directions, a still greater weakening of the sequence requirement on both types of load carriers or articles can be achieved, which, e.g., is advantageous when picking partial orders.

In such an arrangement, a plurality of picks and puts can then be processed at the same time in parallel.

The load carriers can be containers, trays, boxes, etc.

The put place may constantly change in the row when an order loud carrier further forward in the row is fully picked and conveyed away. The put place of the order load carrier preferably changes when a chronologically preceding order load carrier has been fully loaded and discharged (i.e. removed from the row). This is usually the first order load carrier in the row.

However, it can also be the case that an order load carrier disposed within the row has been fully loaded and output onto the discharging conveying system. The subsequent order load carrier then can be move up. This is analogous to a classic build-up row.

The picking can be effected manually by a picker or automatically by a picking device such as, e.g., an appropriately equipped robot or other suitable mechanism or device.

In the case of manual picking, it can be useful for the respective order load carrier to be displayed to the picker during each picking process, e.g. by a put-to-light display. However, it is of interest that, according to this disclosure, the put place of an order load carrier changes. It is thus likewise useful if the display of the respective order load carrier changes along with the order load carrier. This preferably happens virtually, i.e. the displays are stationary and only the "content" moves, adapting to the respective changing order load carrier.

The order load carriers preferably can be conveyed in a first-in-first-out (FIFO) row through the picking station.

This disclosure likewise relates to a corresponding picking station for picking articles according to the goods-to-man principle, wherein articles may be picked from product load carriers into order load carriers, and the product load carriers may be conveyed through the picking station on a first conveying system, and the order load carriers are conveyed through the picking station on a second conveying system.

In accordance with this disclosure, the order load carriers can be conveyed through the picking station together in a row on the second conveying system and together in a row on the first conveying system, and at least each load carrier may be allocated a changing put place.

Therefore, as described above, the conveying system can be simplified. In addition, ergonomic improvements for the picker are made (see above) since by virtue of the FIFIO row used, the picking processes are concentrated on the order load carrier at the start of the row.

It may be preferable if each put place is formed as an individually controllable and operable conveying section of the second conveying system. Each order load carrier then can be allocated a changing put place.

If an order load carrier is fully loaded, the order load carder can be pushed off the second conveying system onto a discharging gathering conveying system. This can be effected manually or by an automatic push-off device such as, e.g., a pusher or a belt transfer means. This will usually be the first order load carrier at the beginning of the row. It is thus usually sufficient for the gathering conveying system to connect to the second conveying system at that location. However, provision can also be made for the discharging gathering conveying system to be disposed in order to permit a part of the row or even the whole row to be transferred or pushed off. For example, it can be disposed in parallel with the second conveying system.

In order to facilitate and improve picking, a picking display can be allocated to each picking place and move or change jointly along with the respective order load carrier in the row. It may be preferred if these travel together virtually as described above, for which purpose a virtual picking display is allocated (paired) to an order load carrier upon entry to the row and travels therewith in the row. Only the real display location can then be changed again based at least in part on the position change of the order load carrier. For this purpose, stationary classic put-to-light displays can be used, each being connected to the virtual display. It would also be feasible to use a type of in-progress display on which the display moves or changes based at least in part on a change in the display region connected to the virtual picking display.

It can be useful for the order load carrier to be conveyed in a space-saving manner on a third conveying system below the second conveying system. They can then be raised by means of an elevator onto the second conveying system. Therefore, in a constructionally simple manner a space-saving arrangement can be created. A further advantage is found in the good accessibility of the picking station, since the order circuit is guided vertically, the stations are freely accessible (without reaching over or the like). When arranging a row of picking places, the conveying system lies on only one side of the row. Nevertheless, source and target containers are located at one level in an ergonomically favorable manner. Furthermore, in this way, many buffer places for orders can be housed in a small space.

When the picking stations are designed as double stations, the stations can be divided over the discharging gathering conveying system so that less space is required and only 50% of the cost of a station needs to be allocated to them.

Further features and details of the invention are apparent from the following description taken in conjunction with the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 1 shows a schematic plan view of a picking station in accordance with the principles of this disclosure;

FIG. 2 shows a cross-sectional view of the picking station of FIG. 1 along the line A-A;

FIG. 3 shows a schematic plan view of a double picking station in accordance with the principles of this disclosure; and FIG. 4 shows a cross-sectional view of the picking station of FIG. 3 along the line B-B.

DETAILED DESCRIPTION

FIGS. 1-4 show one or more manual picking stations, designated as a whole by 1, each with a picker 2.

The picking station 1 can be supplied with product containers P on a conveyor track 3 from a central conveying system 4 and, after a change of direction by about 90 degrees, these containers may be conveyed through the picking station 1 on a conveyor track 5.

The picking station 1 can be supplied with order containers A on a conveyor track 6 from a central conveying system 7 and these order containers may be raised via an elevator 8 from the lower level and transported to a higher conveyor track 9 and conveyed thereon through the picking station 1.

The conveyor tracks 3 and 6 thus may serve as buffers. The conveyor tracks 5 and 9 therefore can convey the containers in mutually transverse directions so that the picker 2 remains substantially within a corner working region formed thereby. The container change on the conveyor track 5 can be rapid because old and new containers move at the same time.

The conveyor track 5 can issue onto a discharging gathering belt 10 extending transversely thereto and leading back to the central conveying system 4, 7 and therefore ensuring disposal of the product containers P.

In accordance with this disclosure, provision also can be made for the used product container P i.e., the picker has removed desired articles for the picking order—to be transported onwards immediately and for the next product container P to move up. The confirmation of error-free performance of the respective picking step also can be immediate. In order for a correction to remain possible, however, the product container P can be held in a buffer zone 14 which lies within reach of the picker, before the product container P arrives on the gathering belt 10. Therefore, in the event of an error, the picker can still access to the articles in order to grasp further articles or put hack articles.

The order containers A can be conveyed on the conveyor track 9 in a row through the picking station 1. When an order container A has been fully loaded, it may be automatically pushed onto the gathering belt 10 and therefore introduced into the central conveying system 4, 7 for further handling. The gathering belt 10 can extend to the end of the conveyor belt 9 or, as indicated by a broken line marked 10, can extend over substantially the whole length of the conveyor belt 9 so that a push-off action is possible over substantially the whole length.

The conveyor belt 9 thus can form 6 picking places as put places 11a-f, though other suitable numbers of pick places or put places can be used without departing from this disclosure, which picking places/put places can be each provided with a put-to-light display 12 in order to display to the picker the order container A and the number of articles for the upcoming picking step (put).

In order to allow the order containers A to move up in the row on the conveyor belt 9 without leaving gaps, each put place 11a-f can be designed as an individually controllable and operable conveying section 13. Therefore, in spite of the pushing-off of an order container A, which is not disposed at the front in the row, a gap-free row can be retained. It is possible to dispense with this conveying section 13 when the gathering belt 10 extends only as far as the first put place 11 (indicated by the region shown with a non-broken line).

The picking station in FIGS. 1 and 2 differs from that in FIGS. 3 and 4 essentially only by the duplication with the gathering belt 10 as a mirror axis and therefore divided use of the discharging gathering conveying system. Therefore, corresponding parts of both picking stations are designated by corresponding reference signs.

Picking is carried out in both stations in the same manner as explained below.

The order containers A can be conveyed to the station 1 and disposed in a row on the conveyor track 9 corresponding to the put places 11. At the same time, the first product container P is provided on the conveyor track 5.

By means of the picking displays 12, the picker is now shown how many articles he is to place or load into the respective order containers from the current product container P.

After confirmation of the picking step, the used product container P can be moved to the gathering area 10 and transported away. At the same time, the next product container P can be provided and the next picking step may be carried out.

If a picking order of an order container is being processed, the picker is shown that the respective order container A can be pushed off onto the gathering area 10 or the order container A is pushed off automatically.

If this is the first container at the put place 11, the row of order containers can be conveyed further, wherein the put places 11 of the order containers. A change and a new order container is provided via the elevator 8.

This is the standard case since the first order container in the row is also that of which requested product containers had most time to be conveyed to the picking station.

However, if this is another order container in the row, the other containers A can move up, for which purpose the conveying sections 13 are operated and controlled in a corresponding manner, and a new order container may be provided by the elevator 8.

The process then can begin anew.

The foregoing description generally illustrates and describes various embodiments of the present invention. It will, however, be understood by those skilled in the art that various changes and modifications can be made to the above-discussed construction of the present invention without departing from the spirit and scope of the invention, as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A method for picking articles according to the goods-to-man principle at a picking station for loading the articles into a series of order load carriers, comprising:

conveying the series of order load carriers through the picking station, the series of order load carriers including at least one set of multiple order load carriers arranged in a predetermined configuration of order load carriers with each order load carrier of the set of order load carriers being located at a put place or area for loading of one or more articles therein and positioned in substantially parallel series in relation to one another in a substantially gap-free row arrangement along the picking station;

changing a respective put place or area of one or more of the order load carriers of the set of order load carriers received at the picking station, when at least one chronologically preceding order load carrier of the set of order load carriers has been loaded and discharged from the picking station; and further conveying at least one order load carrier of the series of order load carriers into an open put place or area after the chronologically preceding order load carrier is discharged in order to maintain the substantially gap-free row arrangement of the set of order load carriers at the picking station.

2. The method of claim 1, wherein the articles are present in product load carriers and picking is carried out therefrom.

3. The method of claim 1, further comprising displaying one or more order load carriers of the series of order load carriers to a picker during each picking process on a display allocated to at least one of the put places or areas.

4. The method of claim 3, further comprising changing the display to correspond to one or more of the set of order load carriers at the put places or areas.

5. The method of claim 1, further comprising conveying multiple order load carriers of the series of order load carriers in a first-in-first-out (FIFO) row through the picking station.

6. The method of claim 1, wherein upon removal of desired articles for the picking order, used article load carriers are transported out of a pick place of the picking station into a buffer zone lying within reach of the picker, and the next article load carrier moves up into the pick place and only after confirmation of the error-free performance of the respective picking step is the used article load carrier transported away out of the buffer zone and therefore out of the picking station.

7. A picking station for picking goods or articles according to the goods-to-man principle, comprising:

a series of order load carriers;

a first conveying system, wherein the articles are conveyed through the picking station on the first conveying system; and a second conveying system, wherein the order load carriers are conveyed through the picking station on the second conveying system, and wherein the order load carriers are conveyed jointly in a prescribed configuration of order load carriers along the second conveying system defining at least one set of order load carriers including multiple order load carriers arranged in a gap-free row and moving in substantially parallel series through the picking station on the second conveying system, and wherein each order load carrier of the set of order loader carriers is allocated a changing put place or area at which goods or articles are correspondingly placed within the set of order load carriers, each put place or area comprising an individually controllable and operable conveying section of the second conveying system, and wherein when at least one order load carrier of the set of order load carriers is discharged from the picking station, its put place or area is allocated to another order load carrier of the series of order load carriers so as to substantially maintain the prescribed configuration of order load carriers at the picking station.

8. The picking station of claim 7, further comprising a discharging gathering conveying system, wherein one or more loaded order load carriers of the set of order load carriers are pushed off the second conveying system onto the discharging gathering conveying system.

9. The picking of claim 7, wherein each put place or area is allocated a picking display which changes as one or more order load carriers of the series of order load carriers are positioned about the put places or areas.

10. The picking station of claim 9, further comprising a third conveying system, wherein one or more of the series of order load carriers are conveyed on the third conveying system below the second conveying system.

\* \* \* \* \*